United States Patent
Toskala

(10) Patent No.: US 7,079,510 B1
(45) Date of Patent: Jul. 18, 2006

(54) CODE ALLOCATION IN CONNECTION WITH SOFT HANDOVER IN CDMA SYSTEM

(75) Inventor: Antti Toskala, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/673,579

(22) PCT Filed: Feb. 16, 2000

(86) PCT No.: PCT/FI00/00120

§ 371 (c)(1),
(2), (4) Date: Oct. 18, 2000

(87) PCT Pub. No.: WO00/49816

PCT Pub. Date: Aug. 24, 2000

(30) Foreign Application Priority Data

Feb. 19, 1999  (FI) ..................................... 990363

(51) Int. Cl.
*H04Q 7/00* (2006.01)
(52) U.S. Cl. ...................... 370/331; 370/335; 370/342; 455/436
(58) Field of Classification Search ................ 370/335, 370/342, 331, 332, 333; 455/436, 442
See application file for complete search history.

(56) References Cited

U.S. PATENT DOCUMENTS

| 5,956,641 A | * | 9/1999 | Bruckert et al. | ............ 455/442 |
| 6,073,021 A | * | 6/2000 | Kumar et al. | ............ 455/442 |
| 6,141,542 A | * | 10/2000 | Kotzin et al. | ............ 455/101 |
| 6,163,524 A | * | 12/2000 | Magnusson et al. | ........ 370/208 |

(Continued)

FOREIGN PATENT DOCUMENTS

EP  0 878 930 A1  11/1998

(Continued)

OTHER PUBLICATIONS

3GPP FDD Spreading and Modulation, 1999, pp. 1-27.

(Continued)

*Primary Examiner*—Chau Nguyen
*Assistant Examiner*—Christine Ng
(74) *Attorney, Agent, or Firm*—Harrington & Smith, LLP

(57) ABSTRACT

The invention relates to a base transceiver station and a method for allocating a code in connection with soft handover in a CDMA system in downlink transmissions from the base transceiver station to a mobile station, in which method codes are allocated in the base transceiver station according to a specific code tree, wherein a specific first spreading factor corresponds to each code ($C_{2, 1}$) and from a code that has a specific spreading factor, it is possible to derive two codes ($C_{4, 1}$, $C_{4, 2}$) that have a higher second spreading factor. The method comprises allowing the base transceiver station to use said first spreading factor (SF=2) in code allocation in all downlink transmissions; allowing the base transceiver station to use both codes ($C_{4, 1}$, $C_{4, 2}$) that have said second spreading factor (SF=4) in code allocation in downlink transmissions when the receiving mobile station is in connection with only one base transceiver station simultaneously; limiting the use of said second spreading factor (SF=4) in code allocation in downlink transmissions when the receiving mobile station is in connection with at least two base transceiver stations simultaneously so as to allow the base transceiver station to use only one ($C_{4, 1}$ or $C_{4, 2}$) of said two codes ($C_{4, 1}$, $C_{4,2}$) that have said second spreading factor (SF=4).

6 Claims, 3 Drawing Sheets

U.S. PATENT DOCUMENTS

| | | | |
|---|---|---|---|
| 6,175,587 B1 * | 1/2001 | Madhow et al. | 375/148 |
| 6,185,246 B1 * | 2/2001 | Gilhousen | 375/130 |
| 6,233,231 B1 * | 5/2001 | Felix et al. | 370/335 |
| 6,526,065 B1 * | 2/2003 | Cheng | 370/441 |

FOREIGN PATENT DOCUMENTS

| | | |
|---|---|---|
| WO | WO 99/03224 | 1/1999 |
| WO | WO 00/05829 | 2/2000 |
| WO | WO 00/24146 | 4/2000 |
| WO | WO 00/27052 | 5/2000 |

OTHER PUBLICATIONS

UTRA FDD; Transport Channels and Physical Channels, 1999, pp. 1-33.

UTRA Physical Layer General Description by 3GPP TSG RAN WG1, pp. 1-9.

3GPP FDD Multiplexing, Channel Coding and Interleaving Description, 1999, pp. 1-46.

Measurements (FDD), 1999, pp. 1-22.

* cited by examiner

CODE ALLOCATION IN CONNECTION WITH SOFT HANDOVER IN CDMA SYSTEM

The present invention relates to code allocation in connection with soft handover in a CDMA system.

The use of DS-CDMA (Direct Spreading—Code Division Multiple Access) in cellular systems and in connection with so-called soft handover requires either synchronised base transceiver stations or link timing control before new connections are opened between more than one base transceiver station.

In the UTRA (Universal Terrestrial Radio Access) system, which is currently being prepared (and which is being standardised in the 3GPP project, founded by, e.g. the ETSI & ARIB standardisation organisations), so-called channelisation codes are used to separate different mobile stations in a downlink transmission (from a base transceiver station to a mobile phone). Thus, each downlink transmission that comes to a mobile station contains a code of its own on the basis of which the mobile station receives the right message, which belongs to it (and leaves unreceived messages that contain some another kind of code). A specific spreading factor corresponds to each code. The spreading factors SF, i.e. the lengths of channelisation codes, to be obtained are multiples of 2: 1; 2; 4; 8; etc., the highest proposed spreading factors being of the order of 256 or 512. In addition to the channelisation code, a signal is given a base station-specific code, which typically is the same for the whole code tree, and its length is normally longer, of the order of 10 milliseconds, i.e. 40960 chips if the chip rate is 4,096 Mcps.

When the system is asynchronous it is possible that a mobile station MS is in connection with more than one base transceiver station at a time. This situation arises particularly during so-called soft handover. As a result of this, it is required that timing in a downlink transmission must be controlled correctly so that the mobile station can carry out the combining of different signals needed for reception without too long a delay. It has been proposed that this be implemented so that the mobile station measures the timing offset of different base transceiver stations after which the base transceiver stations control the timing of the transmission to each mobile station using the resolution of the maximum spreading factor. When there is a desire to go to a higher spreading factor, e.g. from 256 to 512, it will then be necessary when using the whole code tree to change the timing control resolution to 512 chips instead of 256. It follows from this that mobile stations should be able to compensate for bigger offsets in the timing of base transceiver stations' signals than with the spreading factor 256, due to an increase in the step size of timing control. There is a desire to avoid this.

Now, a method has been invented for allocating codes in connection with soft handover in a CDMA system in downlink transmissions from a base transceiver station (BTS) to a mobile station (MS), the method comprising allocating codes in a base transceiver station (BTS) according to a specific code tree wherein a specific first spreading factor ($SF_N$) corresponds to each code and it is possible to derive from a code that has a specific spreading factor, two codes that have another higher spreading factor ($SF_{N+1}$), and it is characteristic of the method that it comprises allowing the base transceiver station to use said first spreading factor ($SF_N$) in code allocation in all downlink transmissions;

allowing the base transceiver station to use both codes that have said second spreading factor ($SF_{N+1}$) in code allocation in downlink transmissions when the receiving mobile station is in connection with only one base transceiver station simultaneously; and limiting the use of said second spreading factor ($SF_{N+1}$) in code allocation in downlink transmissions when the receiving mobile station is in connection with at least two base transceiver stations (BS A, BS B) simultaneously so as to allow the base transceiver station to use only one of said two codes that have said second spreading factor ($SF_{N+1}$).

Above, $SF_N$ is, e.g. 256 and, in this case, $SF_{N+1}$ is 512. In this case, the mobile station's timing control is carried out on the basis of said first spreading factor (i.e. in the example, the spreading factor 256).

The advantages of the invention are the following:

The spreading factor 512 can be taken into use and, in downlink transmissions, it is possible to use low-rate channels when using services that only require low transfer rate in downlink transmissions. Uplink packet-mode service for which e.g. power control and other control signalling on a low-rate channel is implemented in downlink transmissions, should be mentioned as a special case.

The number of channelisation codes increases from max. 256 to 512 when using limitation according to the invention for those connections, for which it is desired to make soft handover possible, the number of codes clearly growing, however, from 256.

Mobile stations do not have to be capable of compensating for the offset according to the spreading factor 512 in base transceiver stations' timing but, instead, operating according to the spreading factor 256 is sufficient.

The spreading factor 512 can also be taken into use later in which case the operation of mobile stations, which are capable of the spreading factor 256, requires no changes.

Also in the sense of performance capacity, when the timing offset remains smaller due to a smaller step size, the closed-loop power control delay is shorter and, thus, the performance capacity is higher.

The spreading factors 256 and 512 are only examples in this case to describe the above-mentioned first and second spreading factors, which will indeed also be used in practice.

According to a second aspect of the invention, a base transceiver station is implemented in a CDMA system, which comprises a transmitter (8) for carrying out downlink transmissions from the base transceiver station towards a mobile station (MS), in which method for allocating a code in connection with soft handover, the base transceiver station comprises allocation means (10) for allocating codes according to a specific code tree, wherein a specific first spreading factor (N) corresponds to each code (e.g. $C_{2,1}$) and it is possible to derive from a code that has a specific spreading factor, two codes ($C_{4,1}$, $C_{4,2}$) that have a higher second spreading factor (SF=4), and it is characteristic of the base transceiver station that it further comprises control means (10, 19) for allowing the use of the first spreading factor (N) in code allocation in all downlink transmissions, and for allowing the use of both codes that have the second spreading factor (SF=4) in code allocation in downlink transmissions when the receiving mobile station is in connection with one base transceiver station simultaneously; and limitation means (10, 19) for limiting the use of said second spreading factor (SF=4) code in allocation in downlink transmissions when the receiving mobile station is in connection with at least two base transceiver stations (BS A, BS B) simultaneously so as to allow said allocation means (10) to use only one ($C_{4,1}$ or $C_{4,2}$) of said two codes ($C_{4,1}$, $C_{4,2}$) that have said second spreading factor (SF=4).

In the following, the present invention will be discussed in detail by referring to the enclosed drawings, in which FIG. 1 shows a code tree in a base transceiver station;

Figure 1:
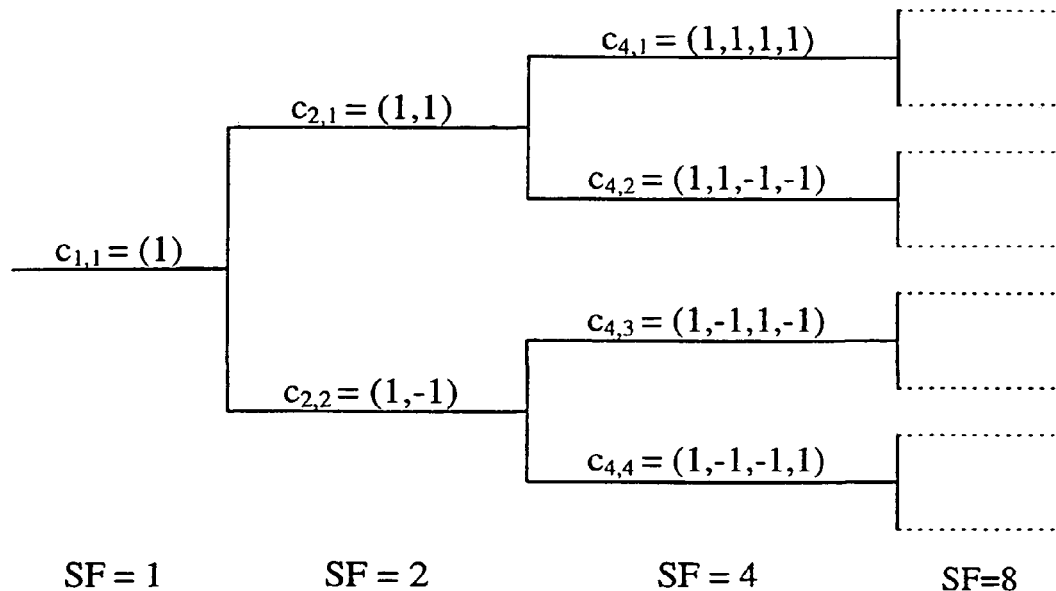

FIG. 1 shows so-called channelisation codes, which are defined according to the code tree in FIG. 1 up to the desired length. Thus, each downlink transmission that comes to a mobile station contains a code of its own on the basis of which the mobile station receives the right message that belongs to it (and leaves unreceived messages that contain another kind of code). Each base transceiver station has in a memory a code tree, according to FIG. 1, wherein a specific spreading factor corresponds to each code level of the tree. The spreading factors SF, i.e. channelisation code lengths, to be obtained are hence multiples of 2: 1; 2; 4; 8; etc., the highest proposed spreading factors being of the order of 256 or 512. As can be seen from FIG. 1, it is possible to derive from each code that has a specific spreading factor $SF_N$, two codes that have a higher spreading factor $SF_{N+1}$. For example, codes $C_{4,1}$ and $C_{4,2}$ (whose SF=4) can be derived from the code $C_{2,1}$ (whose SF=2). In addition to the channelisation code, a signal is given a base transceiver station-specific code which typically is the same for the whole code tree, and normally its length is longer, of the order of 10 milliseconds, i.e. 40960 chips if the chip rate is 4,096 Mcps.

The channelisation codes are orthogonal in relation to each other and due to the code properties, e.g. there only exists 256 orthogonal codes of the length 256. Because there is a limited number of codes, their effective allocation is important, and the operating mode is always the most preferred the higher the spreading factor is that can be used because, in this case, the least code resources are spent from a base transceiver station.

Figure 2:
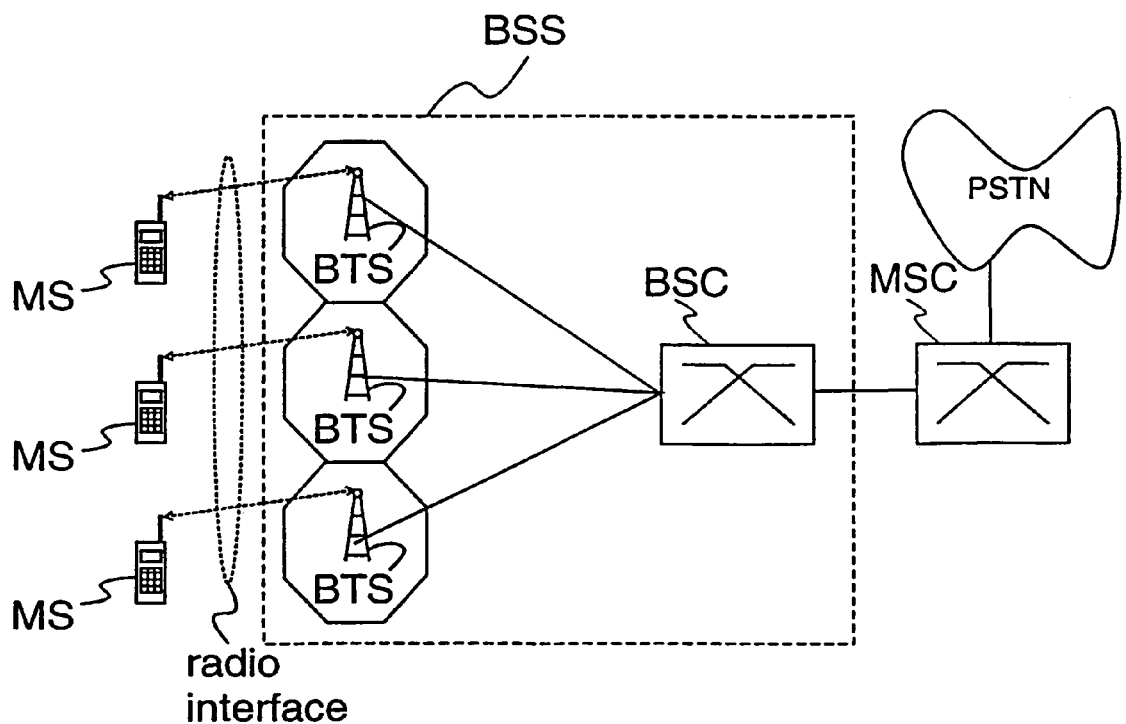
FIG. 2 shows the structure of a mobile communication network.

FIG. 2 shows the structure and connections of a mobile communication network. Mobile stations MS are in connection with base transceiver stations BTS over a radio path. The base transceiver stations BTS are further in connection with a base station controller BSC, which controls and manages several base transceiver stations. The entity formed by several base transceiver stations BTS (typically some dozens of base transceiver stations) and the single base station controller BSC that controls them is called a base station system BSS. Particularly, the base station controller BSC manages radio communication channels, as well as handovers. On the other hand, the base station controller BSC is in connection with a mobile services switching centre (MSC), which co-ordinates the establishment of connections from mobile stations and to mobile stations. Through the MSC, it is possible to further establish a connection to outside the mobile communication network.

In downlink transmissions, messages come to base transceiver stations BTS from a mobile services switching centre MSC over different channels depending on which message is going to which mobile station when several mobile stations are in connection with the base transceiver station.

After the channelisation code is given, parallel code channels are further put in a "scrambling" operation, which is carried out using a base transceiver station-specific code to separate different base transceiver stations from each other.

Figure 3:
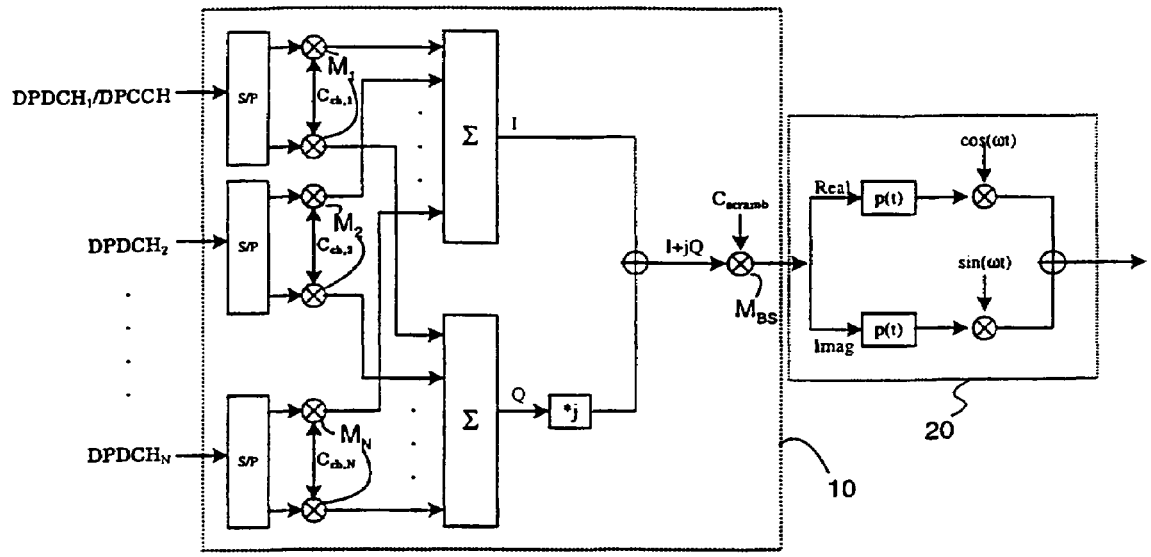
FIG. 3 shows a base transceiver station's transmission in a multi-code case (several codes for one mobile station)

FIG. 3 shows a code generator 10 wherein $DPDCH_2$ ... $DPDCH_N$ present parallel channels, allocated to the same user, which are first given channelisation codes with mixers $M_1, M_2, \ldots, M_N$, and a base transceiver station-specific code is given with a mixer $M_{BS}$. In FIG. 3, code generation is shown to take place for signals divided into real and imaginary signals (i.e. I and Q signals), which are summed. After code generation, a signal shall further undergo I/Q modulation in a modulator 20, after which it is transmitted to a mobile station over a radio path. If the parallel channels according to the figure are for different users, the difference is that in addition to the DPDCH, each parallel channel has with it a DPCCH that contains the control information, which carries, e.g. the closed-loop power control commands.

Code allocation and generation in the UTRA system is also described in a document entitled "3GPP FDD Spreading and Modulation" (incorporated by reference).

Figure 4:
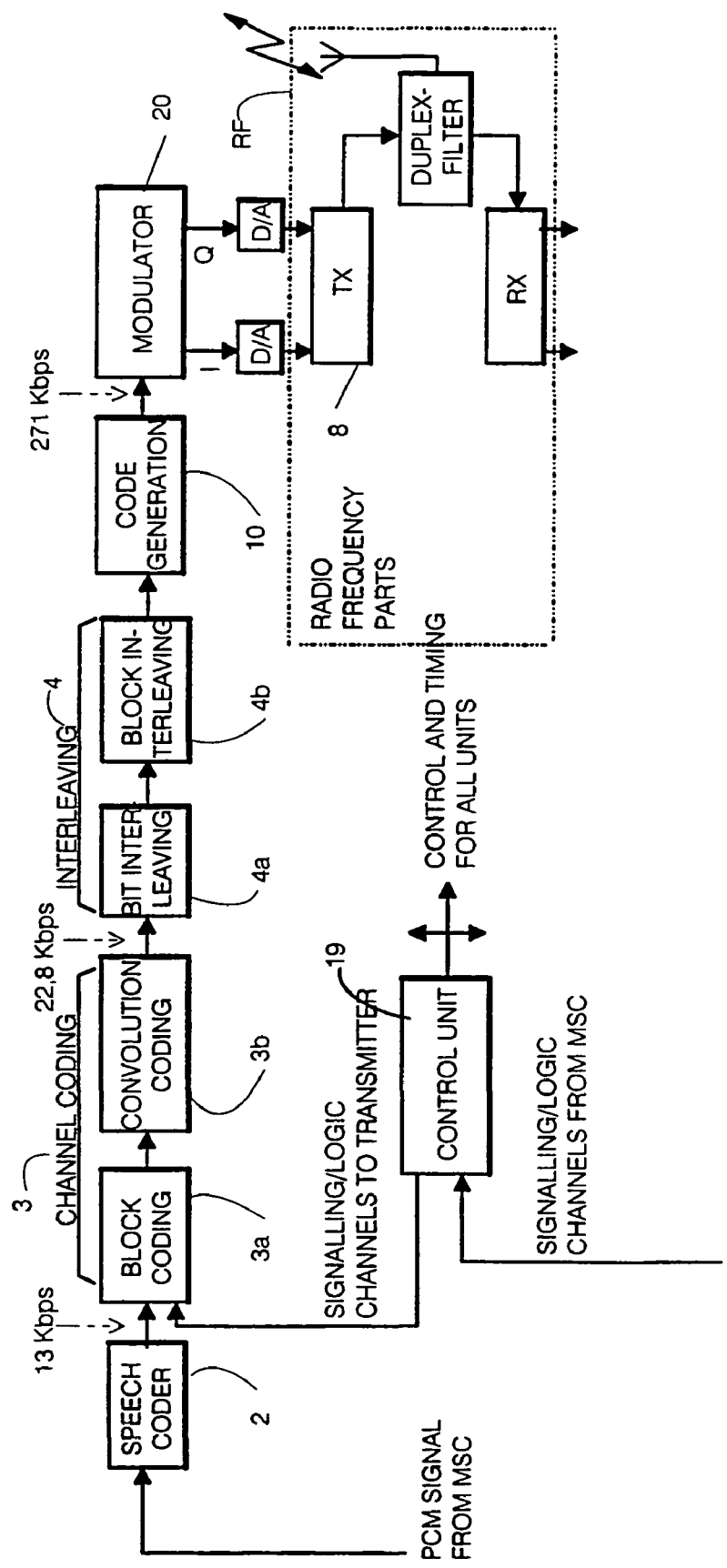
FIG. 4 shows, in block diagram form, a base transceiver station's operations in a transmission.

FIG. 4 shows by way of example the operations of a base transceiver station at a block diagram level. A speech coder 2 is, in fact, located in a mobile services switching centre MSC and codes for the MSC speech that arrives in a PCM format, controlled by the BTS. As a result of the coding of the speech coder 2, speech frames, which are, e.g. 260 bits long, are obtained. The bit amounts discussed below are also exemplary.

After speech coding 2, channel coding 3 will be carried out in two steps, whereupon first (260 bits) part of the bits (50 most important) are protected with a block code 3a (=CRC, 3 bits) and, after that, these and the next most important bits (132) are further protected with a convolution code 3b (coding ratio 1/2) ((50+3+132+4)*2=378), and part of the bits are taken unprotected (78). As is shown in FIG. 4, signalising and logic messages arrive directly from a control unit 19, which controls the base transceiver station blocks, to the block coding block 3a and, therefore, no speech coding will be carried out for these data messages, naturally. In block coding 3a, a bit string is connected to the end of a speech frame, by means of which it is possible to express transfer errors at reception. In convolution coding 3b, the redundancy of a speech frame is increased. Thus, a total of 456 bits per 20 ms speech frame are transmitted.

These 456 bits are interleaved 4 and also the interleaving 4 has two steps. First 4a, the bit order of a frame is mixed and the mixed bits are divided into eight blocks of equal size. These blocks are divided 4b further into several consecutive frames, whereupon the interleaved 456 bits are transmitted in several (e.g. eight) time slots of a radio path. The objective of interleaving is to spread the transfer errors, which normally occur as error bursts, more evenly over the entire data to be transmitted, whereupon the operation of channel decoding is the most effective. After de-interleaving, an error burst will change into individual error bits, which can be corrected in channel decoding. The second step in the transmission sequence is code generation 10.

A coded signal is supplied to the modulator 20, which modulates the signal for transmission. The transmitter 8 mixes the modulated signal through an intermediate frequency to a radio frequency (in the UTRA system, approx. 2 GHz) and transmits it through an antenna on to a radio path.

Transport channels and physical channels in the UTRA system are described in a document entitled "UTRA FDD; Transport Channels and Physical Channels" (incorporated by reference) and in a document entitled "Physical layer—general description" (incorporated by reference). Multiplexing, channel coding and interleaving in the UTRA system are also described in a document entitled "3GPP FDD, multiplexing, channel coding and interleaving description" incorporated by reference.

Figure 5:
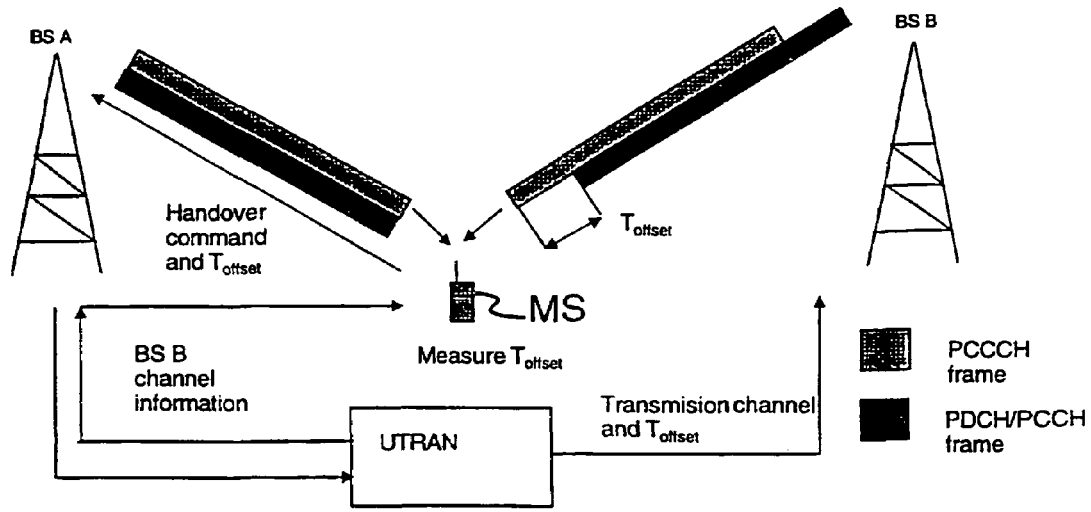
FIG. 5 shows a mobile station's timing control in soft handover.

When the system is asynchronous, it is possible that a mobile station MS is in connection with more than one base transceiver station at a time. This situation arises during so-called soft handover. As a result of this, it is required that timing in a downlink transmission must be controlled correctly so that the mobile station can carry out the combining of different signals needed for reception without too long a delay. It has been proposed that this be implemented so that the mobile station measures the timing offset of different base transceiver stations and then the base transceiver stations control the timing of the transmission to each mobile station using the resolution of the maximum spreading factor. FIG. 5 illustrates the matter, wherein a mobile station MS is, during soft handover, in connection with a base transceiver station BS A and a base transceiver station BS B so that the mobile station MS is first in connection with the base transceiver station BS A, carries out the measurement of the timing offset $T_{offset}$, which it reports to the network through the base transceiver station BS A, whereupon the base transceiver station BS B controls the timing of a downlink transmission on the basis of this so that the base transceiver stations BS A and the base transceiver stations BS B are synchronised in relation to the mobile station MS. Measurements in the UTRA system are described in a document entitled "Measurements (FDD)" incorporated by reference.

In a method according to the invention for allocation a code in connection with soft handover in a CDMA system in downlink transmissions from a base transceiver station BTS to a mobile station BS:

codes are allocated in the base transceiver station BTS according to a specific code tree, wherein a specific first spreading factor (e.g. 256) corresponds to each code (e.g. $C_{256, 1}$) and it is possible to derive from a code that has a specific spreading factor, two codes ($C_{512, 1}$ and $C_{512, 2}$) that have a higher second spreading factor (in this case, e.g. 512). The method according to the invention comprises:

allowing the base transceiver station to use said first spreading factor (e.g. SF=256) in code allocation in all downlink transmissions;

allowing the base transceiver station to use both codes that have said second spreading factor (i.e. SF=512) in code allocation in downlink transmissions when the receiving mobile station is in connection with only one base transceiver station simultaneously; and limiting the use of said second spreading factor (in this example, 512) in code allocation in downlink transmissions when the receiving mobile station is in connection with at least two base transceiver stations (BS A, BS B) simultaneously so as to allow the base transceiver station to use only one ($C_{512, 1}$ or $C_{512, 2}$) of said two codes ($C_{512, 1}$ and $C_{512, 2}$) that have said second spreading factor.

In this case, the mobile station's timing control is carried out on the basis of said first spreading factor (i.e., in the example, the spreading factor 256).

Code generation is carried out in the block 10 shown in FIGS. 3 and 4. A method according to the invention is implemented in the code generator 10 and the control unit 19 preferably programmably, whereupon when programmed using the method according to the invention, a base transceiver station's code generator 10 and control unit implement the limitation of code allocation. The base transceiver station is informed in the signalling coming in from a mobile station of whether the mobile station is simultaneously in connection with some other base transceiver station. On the basis of this, the base transceiver station, controlled by the control unit 19, implements the allowance and limitation of code allocation according to the method. For timing control, the base transceiver station uses said second higher spreading factor $SD_{N+1}$ as resolution. The base transceiver station carries out the control of its timing on the basis of the timing offset it has received from the mobile station.

In the present description and claims, unless otherwise provided by the context, the word "comprise" and its variations, such as "comprising", is understood to mean the inclusion of a named entity or step or a group of entities or steps and not the exclusion of any other entity or step or a group of entities or steps.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

The invention claimed is:

1. A method for allocating a code in connection with soft handover in a CDMA system in downlink transmissions from a base transceiver station (BTS) to a mobile station (MS), the method comprising:

allocating codes in the base transceiver station (BTS) according to a specific code tree, wherein a specific first spreading factor (SF=2) corresponds to each code ($C_{2, 1}$) and it is possible to derive from a code that has a specific spreading factor, two codes ($C_{4, 1}$, $C_{4,2}$) that have a higher second spreading factor (SF=4), characterized in that the method comprises:

allowing the base transceiver station to use said first spreading factor (SF=2) in code allocation in all downlink transmissions;

allowing the base transceiver station to use both codes simultaneously ($C_{4, 1}$, $C_{4,2}$) that have said second spreading factor (SF=4) in code allocation in downlink transmissions when the receiving mobile station is in connection with only one base transceiver station; and limiting the use of said second spreading factor (SF=4) in code allocation in downlink transmissions when the receiving mobile station is in connection with at least two base transceiver stations (BS A, BS B) simultaneously so as to allow the base transceiver station to use only one ($C_{4, 1}$ or $C_{4,2}$) of said two codes ($C_{4, 1}$, $C_{4,2}$) that have said second spreading factor (SF=4).

2. A method according to claim 1, characterized in that, in connection with soft handover, the method comprises:

receiving from the mobile station a timing offset ($T_{offset}$); and carrying out the control of the base transceiver station's timing on the basis of the received timing offset and said first spreading factor (SF=2).

3. A method according to claim 1, characterized in that said first spreading factor is 256 and said second spreading factor is 512.

4. A base transceiver station in a CDMA system, which comprises a transmitter (8) for carrying out downlink transmissions from the base transceiver station towards a mobile station (MS), in which method for allocating a code in connection with soft handover, the base transceiver station comprises:

allocation means (10) for allocating codes according to a specific code tree, wherein a specific first spreading factor (N) corresponds to each code ($C_{2,1}$) and it is possible to derive from a code that has a specific spreading factor, two codes ($C_{4,1}$, $C_{4,2}$) that have a higher second spreading factor (SF=4), characterized in that the base transceiver station further comprises:

control means (10, 19) for allowing the use of the first spreading factor (N) in code allocation in all downlink transmissions, and allowing the use of both codes simultaneously that have said second spreading factor (SF=4) in code allocation in downlink transmissions when the receiving mobile station is in connection with only one base transceiver station; and limitation means (10, 19) for limiting the use of said second spreading factor (SF=4) code in allocation in downlink transmissions when the receiving mobile station is in connection with at least two base transceiver stations (BS A, BS B) simultaneously so as to allow said allocation means (10) to use only one ($C_{4,1}$ or $C_{4,2}$) of said two codes ($C_{4,1}$, $C_{4,2}$) that have said second spreading factor (SF=4).

5. A base transceiver station according to claim 4, characterized in that it comprises, in connection with soft handover, means (8, 10, 19) for receiving a timing offset ($T_{offset}$) from a mobile station; and means (10, 19) for controlling the base transceiver station's timing on the basis of the received timing offset and said first spreading factor (SF=2).

6. A base transceiver station according to claim 4, characterized in that said first spreading factor is 256 and said second spreading factor is 512.

* * * * *